(12) United States Patent
Ouderkirk

(10) Patent No.: US 9,459,392 B2
(45) Date of Patent: *Oct. 4, 2016

(54) ILLUMINATION CONVERTER

(71) Applicant: 3M INNOVATIVE PROPERTIES COMPANY, St. Paul, MN (US)

(72) Inventor: Andrew J. Ouderkirk, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 36 days.

This patent is subject to a terminal disclaimer.

(21) Appl. No.: 14/399,611

(22) PCT Filed: May 9, 2013

(86) PCT No.: PCT/US2013/040245
§ 371 (c)(1),
(2) Date: Nov. 7, 2014

(87) PCT Pub. No.: WO2013/173151

PCT Pub. Date: Nov. 21, 2013

(65) Prior Publication Data
US 2015/0109822 A1    Apr. 23, 2015

Related U.S. Application Data

(60) Provisional application No. 61/647,584, filed on May 16, 2012.

(51) Int. Cl.
*F21V 7/04* (2006.01)
*F21V 8/00* (2006.01)

(52) U.S. Cl.
CPC ............. *G02B 6/002* (2013.01); *G02B 6/0015* (2013.01); *G02B 6/0018* (2013.01); *G02B 6/0028* (2013.01); *G02B 6/0065* (2013.01); *G02B 6/0073* (2013.01)

(58) Field of Classification Search
CPC  G02B 6/0028; G02B 6/0018; G02B 6/0001; G02B 6/0011; G02B 6/002; G02B 6/0031; G02B 6/0046; G02B 6/0061; G02B 6/0065; G02B 6/0073; G02B 6/4298
See application file for complete search history.

(56) References Cited

U.S. PATENT DOCUMENTS 4,824,194 A * 4/1989 Karasawa ................ G02B 6/06
250/586
5,005,108 A   4/1991 Pristash
(Continued)

FOREIGN PATENT DOCUMENTS

EP    0663264    7/1995
EP    1137130    9/2001
(Continued)

OTHER PUBLICATIONS

International Search Report for PCT International application No. PCT/US2013/040245, mailed on Jul. 23, 2013, 5pgs.

*Primary Examiner* — Peggy Neils
*Assistant Examiner* — Alexander Garlen
(74) *Attorney, Agent, or Firm* — Jeffrey M. Olofson

(57) ABSTRACT

The disclosure generally relates to illumination converters that are capable of converting light from one geometrical format to another. In particular, the described illumination converters are capable of converting a circular source such as an LED to a linear source useful in an edgelit waveguide, which can be used in a backlight for a display. The converter consists of a waveguide plate (210) with two edges (220, 218) oriented towards each other at 45° such that a the waveguide plate consists of a rectangular part (204) attached to a triangular part (202). The triangular part is rolled into a coil around a central axis (250) and one side of the coil is used for coupling in of the light from a source.

20 Claims, 4 Drawing Sheets

(56) References Cited

U.S. PATENT DOCUMENTS

| | | |
|---|---|---|
| 5,128,281 A | 7/1992 | Dyer |
| 5,675,678 A * | 10/1997 | Neuberger ............ G02B 6/001 385/147 |
| 7,625,111 B2 | 12/2009 | Lee |
| 9,116,261 B2 * | 8/2015 | Ouderkirk ............ G02B 6/0018 |
| 2004/0174715 A1 | 9/2004 | Page |
| 2010/0214786 A1 * | 8/2010 | Nichol ................ G02B 6/0018 362/296.01 |
| 2011/0227487 A1 * | 9/2011 | Nichol ................ G02B 6/0018 315/158 |

FOREIGN PATENT DOCUMENTS

| | | |
|---|---|---|
| WO | WO 03-040616 | 5/2003 |
| WO | WO 2005-024476 | 3/2005 |
| WO | WO 2009-151842 | 12/2009 |
| WO | WO 2012-064519 | 5/2012 |

\* cited by examiner

ILLUMINATION CONVERTER

CROSS REFERENCE TO RELATED APPLICATIONS

This application is a national stage filing under 35 U.S.C. 371 of PCT/US2013/040245, filed May 9, 2013, which claims priority to US Provisional Application No. 61/647584, filed May 16, 2012, the disclosure of which is incorporated by reference in its/their entirety herein.

RELATED APPLICATION

This application is related to PCT Patent Application No. PCT/US2011/058213 entitled ILLUMINATION CONVERTER, with an international filing date of Oct. 28, 2011, incorporated herein by reference.

BACKGROUND

Spatial light modulators, including particularly liquid crystal displays (LCDs), often use a backlight or a frontlight to provide light for the display. A common light source for these lights are light emitting diodes (LEDs), with the LEDs either being directly underneath the LCD (so-called direct lit) or illuminating the edge of a waveguide disposed below the LCD (so-called edge lit), or a combination of the two. An example of a combination is where the backlight is made of an array of LEDs illuminating a waveguide, where the waveguides are tiled to form a backlight.

Optical waveguides can be either flat sheets or can be tapered, and may have edges that are coated with a reflective material, such as a metallic tape. The waveguides are commonly manufactured by molding or casting of resin into the near-final or final shape, or are fabricated from a larger sheet.

SUMMARY

The disclosure generally relates to illumination converters that are capable of converting light from one geometrical format to another. In particular, the described illumination converters are capable of converting a circular source such as an LED to a linear source useful in an edgelit waveguide, which can be used in a backlight for a display. In one aspect, the present disclosure provides an illumination converter that includes a spiral-wound portion of a visible-light transparent film and a planar portion of the visible-light transparent film. The spiral-wound portion of a visible-light transparent film includes a central axis about which the visible-light transparent film is wound; a light input surface perpendicular to the central axis, the light input surface comprising a first edge of the visible-light transparent film; a reflective surface comprising a second edge of the visible-light transparent film disposed at a 45 degree angle to the first edge of the visible-light transparent film; and a light output region parallel to the central axis. The planar portion of the visible-light transparent film extends tangentially from the spiral-wound portion of the visible-light transparent film to a light output edge of the visible-light transparent film, wherein the visible-light transparent film is a glass film.

In another aspect, the present disclosure provides a backlight that includes an illumination converter and a light emitting diode (LED). The illumination converter includes a spiral-wound portion of a visible-light transparent film and a planar portion of the visible-light transparent film. The spiral-wound portion of a visible-light transparent film includes a central axis about which the visible-light transparent film is wound; a light input surface perpendicular to the central axis, the light input surface comprising a first edge of the visible-light transparent film; a reflective surface comprising a second edge of the visible-light transparent film disposed at a 45 degree angle to the first edge of the visible-light transparent film; and a light output region parallel to the central axis. The planar portion of the visible-light transparent film extends tangentially from the spiral-wound portion of the visible-light transparent film to a light output edge of the visible-light transparent film, wherein the visible-light transparent film is a glass film. The LED is disposed adjacent the light input surface and capable of injecting light into the light input surface.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
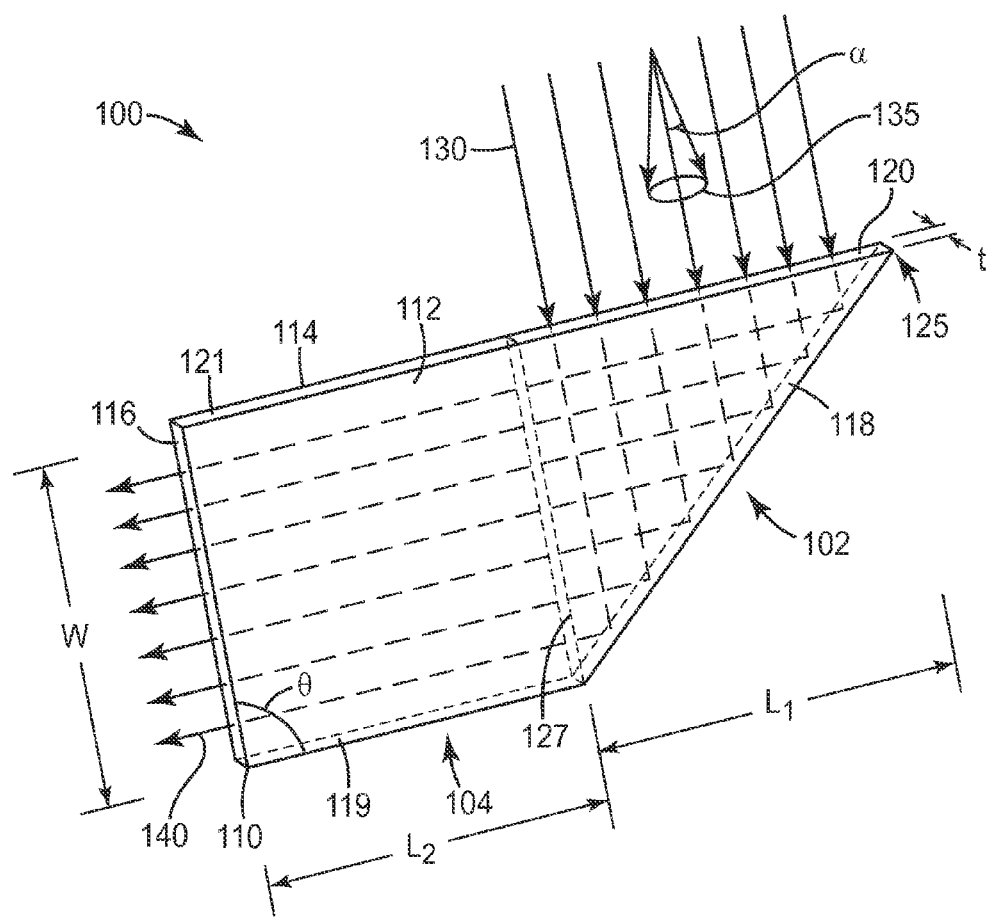
FIG. 1 shows a perspective schematic of an illumination redirector.

The present disclosure describes a light distribution device for a backlight or frontlight useful in a spatial light modulator display. The light distribution device can generally be described as an illumination converter that accepts an input light from a source, such as a point source or other small cross-sectional area source, and converts the light to a line source that can be used, for example, to illuminate the edge of a waveguide.

In one particular embodiment, the illumination converter can include at least one LED, collection optics for light emitted by the LED, and a transparent film cut with an input edge, an output edge, and a reflective edge. In one particular embodiment, the input and output edges form a right angle, and the reflective edge is at a 45 degree angle with respect to the input and output edges. The film can be rolled into a cylindrical shape with the input edge furthest from the output edge in the center of the cylinder, the axis of the cylinder being parallel to the output edge, and where the output of the collection optics illuminates the end of the cylinder formed with the input edge.

Edge lighting can have advantages over direct lighting, due to the waveguide being thinner while at the same time achieving a uniformly illuminated display. Edge illumination has several challenges, however. The aspect ratio (for example, width to thickness) of the edge of the waveguide is usually very high, often exceeding 10:1 or even over 100:1, while typical LEDs have an aspect ratio close to one. This can create several problems when attempting to couple the LED to the edge of the waveguide to sufficiently illuminate the display. In some cases, typically only a small number of LEDs are used to illuminate one or more edges of the waveguide, and this can create non-uniformity in the LCD illumination across the surface of the waveguide. In some cases, the etendue of the optical system can increase, with a resulting increase in the thickness required for the waveguide. This can result in a potential reduction in the recycling system efficiency of the backlight using different gain films.

In some cases, the LED edge-lit displays use one of a number of approaches to generate white light. One such approach is to add a phosphor to an ultraviolet (UV) or blue LED to produce white light by downconverting the emitted radiation. The phosphor typically increases the etendue of small LEDs to a greater extent than with large LEDs. Another approach to generate white light is to combine red, green, and blue light emitting LEDs. Conventional edge-lit waveguides can make it very difficult to use such color combining optical systems to reduce etendue.

The present disclosure provides an etendue match between a light source and a backlight waveguide by using an illumination converter. The described illumination converter increases the optical efficiency in backlights using recycling films, reduces backlight thickness, and reduces materials cost and consumption.

In one particular embodiment, the illumination converter can be described as a "circle to line" illumination converter; that is, the geometrical format of the input light has been changed from circular to linear. In this embodiment, the illumination converter transforms the typically low aspect ratio output of light collected from an LED, and converts it into a linear light source that can be suitable for use in an edge-lit display.

FIG. 1 shows a perspective schematic of an illumination redirector 100, according to one aspect of the disclosure. In one particular embodiment, illumination redirector 100 shows attributes of a visible-light transparent film 110 that can be used to form an illumination converter, as described elsewhere. The visible-light transparent film 110 can be a highly transparent polymer or glass film, preferably with less than 6 dB/m loss for light having a wavelength of between 450 and 650 nm. Loss can result from effects such as volume or surface scattering and absorption. Suitable polymers include acrylates, especially polymethylmethacrylate, polystyrene, silicones, polyesters, polyolefins, polycarbonates, and the like. The polymer film may be made by extrusion, cast and cure, or solvent coating.

Suitable glass films include those based on inorganic oxides, particularly amorphous inorganic oxides. Preferred are glasses based on silicon dioxide, especially glasses based on mixtures of silicon dioxide with one or more of the following: oxides of aluminum, magnesium, calcium, lithium, sodium, potassium, iron, chromium, manganese, cobalt, titanium, sulfur, barium, strontium, lead, zirconium, lead, and elements including fluorine and selenium. Especially preferred are borosilicate glasses such as N-BK7 made by Schott glass. The glass is preferably made as a thin film with very smooth surfaces using suitable drawing processes known in the art, such as those used for making glass films for the Liquid Crystal Display (LCD) industry. The term "film" or "sheet" is used interchangeably herein for describing polymer and glass forms, and includes materials with a thickness between about 10 and 2000 microns.

The visible-light transparent film 110 includes a first portion 102 and a second portion 104 separated by a light output region 127. The visible-light transparent film 110 further includes a first major surface 112, a second opposing major surface 114, and a light output edge 116 between them. Light output region 127 represents a cross-section through visible-light transparent film 110 that is perpendicular to light input edge 120. In some cases, it may be desirable to form an angle on light output edge 116 relative to light output region 127, and as such represents a cross-section through visible-light transparent film 110 that can be disposed at an angle "θ" (shown to be approximately 90 degrees in FIG. 1) to the second edge 119.

Each of the edges described herein have a thickness "t", where "t" is much smaller than any other dimension in visible-light transparent film 110, which leads to a high-aspect ratio (that is, either width or length divided by thickness) waveguide. The other dimensions in visible-light transparent film 110 such as width "W", first length "L1" that includes a light input edge 120, and second length "L2" that includes a first edge 121 and a second edge 119 opposite first edge 121, can each be up to 10 times greater, up to 100 times greater, or even more than 100 times greater than the thickness "t" of the visible-light transparent film 110.

The first portion 102 of visible-light transparent film 110 includes a reflective edge 118 that is disposed at a 45 degree angle to the light input edge 120, and extends from light input tip 125 to light output region 127. The reflective edge 118 may include a polished surface that is capable of enabling total internal reflection (TIR) within the visible-light transparent film, or by a reflective coating disposed on the edge surface. In some cases, the reflective coating can include a metallic coating such as silver, aluminum, and the like, or the reflective coating can include a dielectric coating such as a multilayer dielectric coating including alternating inorganic or organic dielectric layers, as known in the art.

Input visible-light rays 130 enter the first portion 102 of illumination redirector 100 through light input edge 120, reflect from reflective edge 118, pass through light output region 127, and exit illumination redirector 100 through light output edge 116 of second portion 104 of illumination redirector 100, as output visible-light rays 140.

Each of the input visible-light rays 130 can be partially collimated input light rays that are spread through a partially collimated input cone 135 that includes a collimation angle "α". In some cases, the collimation angle "α" can range up to about 45 degrees, up to about 40 degrees, up to about 30 degrees, up to about 20 degrees, or up to about 15 degrees, depending on the configuration of the light source, as known to one of skill in the art. Preferably, the collimation angle "α" can range from about 5 degrees to about 20 degrees.

The path of each of the input visible-light rays 130 within collimation angle "α" through illumination redirector 100 can include multiple reflections from the first and second major surfaces 112, 114, by TIR and the like. Generally, TIR can occur when the index of refraction of the material of the illumination redirector 100 is greater than the index of refraction of material that is in contact with the surfaces of the illumination redirector 100. As such, in some cases, a gap such as an air gap is provided adjacent each of the surfaces where TIR is desired. In some cases, the visible-light transparent film 110 may be coated on one or more surfaces with a low refractive index coating, including fluorocarbons, silicones, and porous materials such as ultralow index coatings and phase separated polyblock copolymers, to enhance TIR. In some cases, the visible-light transparent film 110 may be coated on one or more surfaces with reflective material, such as the metals or dielectric coatings described elsewhere. The visible-light transparent film 110 may have other coatings on one or more surfaces, including hard coats, planarization coatings, and antistatic coatings.

In some cases, the angle "θ" can be less than 90 degrees, such as approximately 45 degrees (not shown), and light output edge 116 can be made to reflect light in a manner similar to reflective edge 118, and transmit the light through second edge 119 (that is, in the same general direction as the direction of input visible-light rays 130 shown in FIG. 1). In some cases, the angle "θ" can be greater than 90 degrees, such as approximately 135 degrees (not shown), and light output edge 116 can be made to reflect light in a manner similar to reflective edge 118, and transmit the light through first edge 121 (that is, in the opposite general direction as the direction of input visible-light rays 130 shown in FIG. 1). It is to be understood that angle "θ" can be adjusted as desired to direct output visible light rays 140 through a chosen output edge, and ultimately into a waveguide, or tiled into a waveguide, as described elsewhere.

Figure 2A:
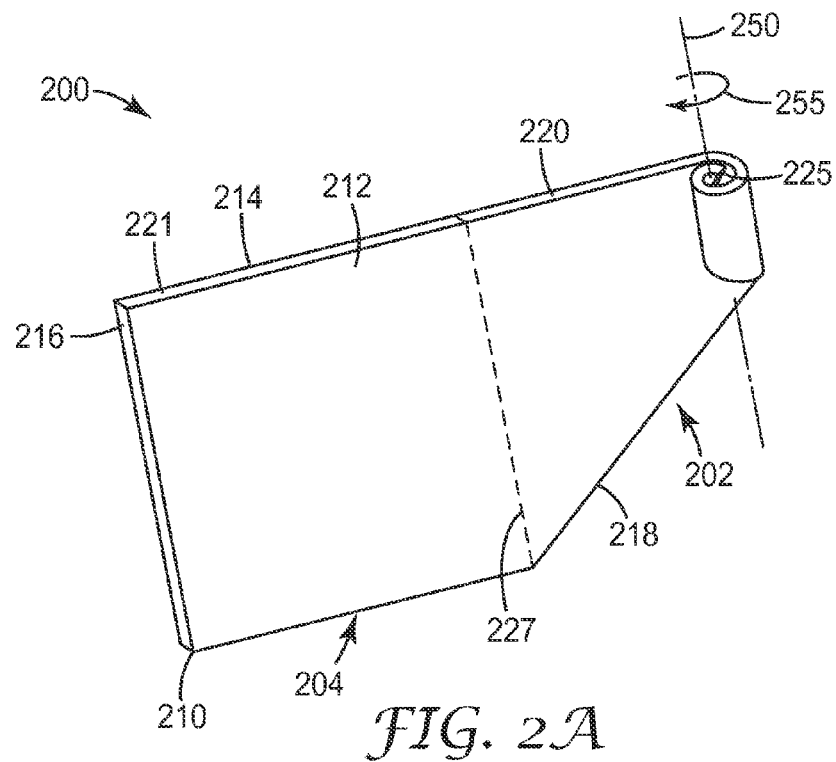
FIGS. 2A-2C shows perspective schematics for an illumination converter.
Figure 2B:
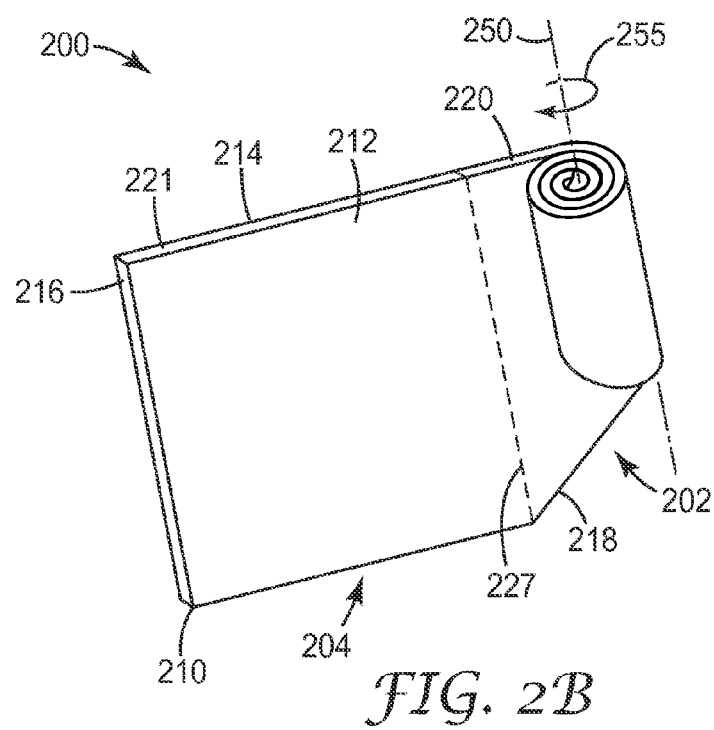
Figure 2C:
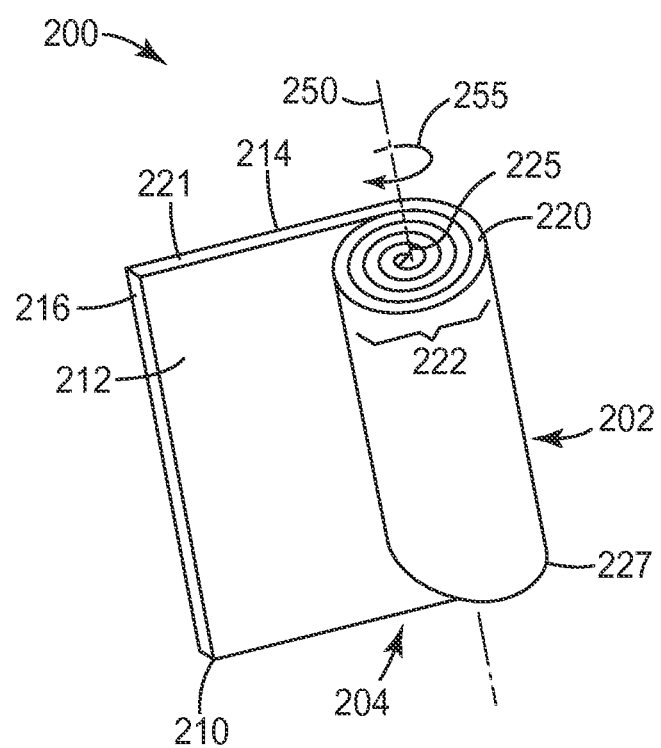

FIGS. 2A-2C shows perspective schematics for an illumination converter 200, according to one aspect of the disclosure. Each of the numbered elements 200-227 in FIGS. 2A-2C correspond to like numbered elements 100-127 presented in FIG. 1, and both the description and the function of each element are correspondingly alike. For example, visible-light transparent film 210 in FIGS. 2A-2C corresponds to visible-light transparent film 110 in FIG. 1.

The first portion 202 (hereinafter referred to as the spiral-wound portion 202) of the visible-light transparent film 210 including the light input edge 220 and 45 degree reflective edge 218, can be rolled into a spiral such that the light input edge 220 forms a light input surface 222 that can be a circular face. Progressing from FIG. 2A to FIG. 2B to FIG. 2C, the visible-light transparent film 210 is spirally wound around a central axis 250 in a winding direction 255, starting with the light input tip 225 and continuing at least until light output region 227 is spirally wound. In this manner, the light input edge 220 becomes a plurality of spiral wraps in a spiral wound portion 202, forming the light input surface 222 into which light can be injected, converting the circular source to a linear source. The second portion 204 (hereinafter referred to as the planar portion 204) of the visible-light transparent film 210 extends tangentially from the spiral-wound portion 202.

The spiral may be loosely assembled to provide a gap, such as an air gap having air interfaces adjacent the visible-light transparent film for promoting TIR, or each layer of the spiral may be bonded with material having a lower refractive index than the visible-light transparent film. For example, the visible-light transparent film may made from a polymer with a relatively high refractive index, such as polycarbonate, and the film may be bonded with a thin layer of adhesive such as an optically clear adhesive (for example, "OCA" available from 3M Company), or a curable low index resin such as an acrylic monomer, which may be cured after rolling the film into a spiral. Low index coatings may also be applied by vacuum coating materials including organic or inorganic materials, or mixtures thereof. Suitable low index coatings include, for example, silicon dioxide and magnesium fluoride.

The spiral may be formed by using a mandrel that conforms to the shape of the inside of the spiral, attaching the beginning of the spiral to the mandrel with a controlled bond adhesive (such as a hot-melt adhesive, vacuum, or mechanical clamping). In the case where a curable bonding system is used to hold the spiral together, the rolled up film may be bonded by using actinic radiation such as ultraviolet or electron beam, or a thermal curing system.

In some cases, the film may be heated to a temperature at which it can be deformed without becoming damaged by, for example, fracturing. Typically, a suitable temperature is between the glass transition temperature and the melting point. The film can then be rolled into the spiral shape while hot, and then cooled to make a stable spiral structure. The film may be coated with a material that softens at the forming temperature and bonds to the adjacent surface in the spiral form.

Figure 3:
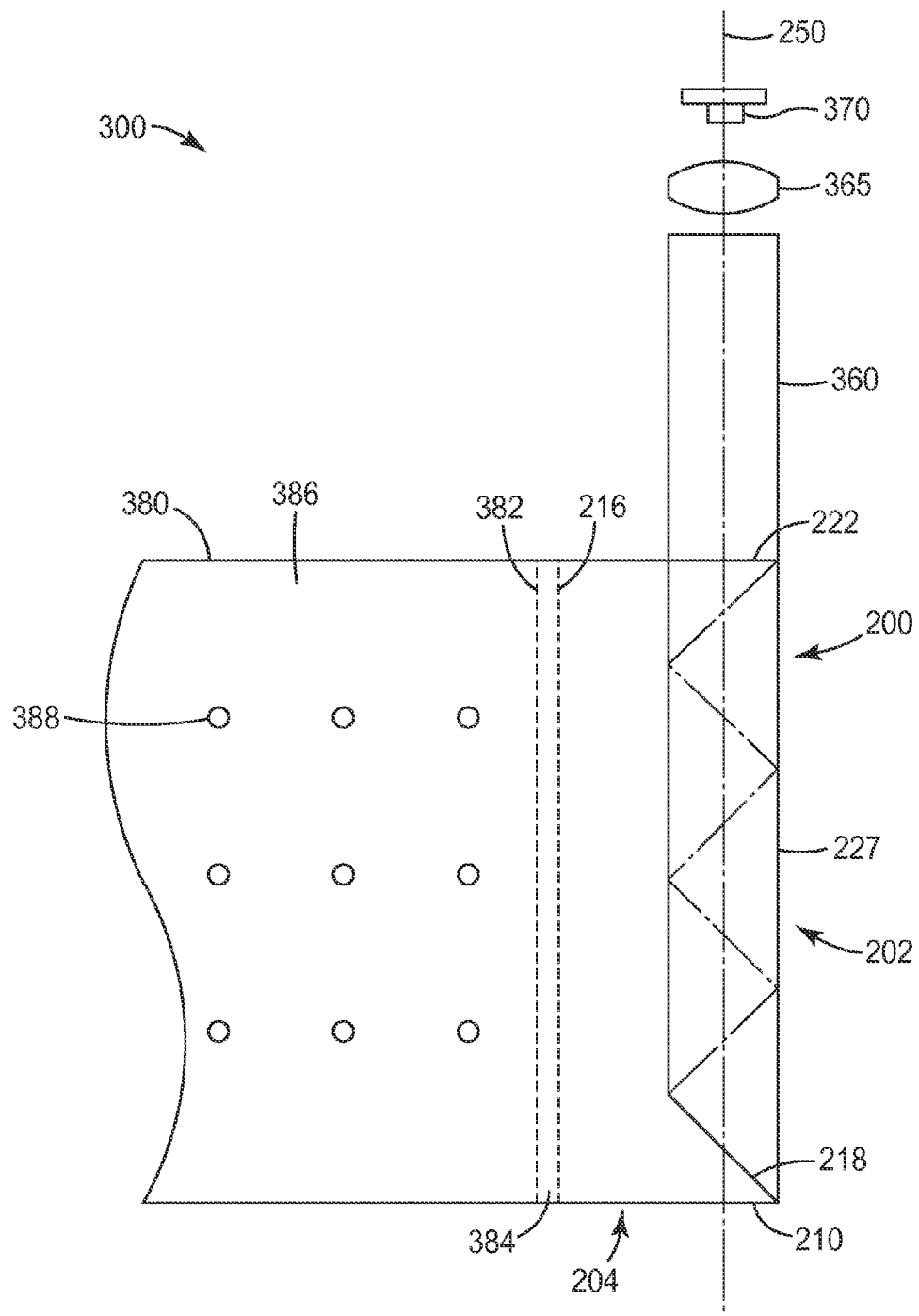
FIG. 3 shows an illumination converter system.

FIG. 3 shows an illumination converter system 300, according to one aspect of the disclosure. Each of the numbered elements 200-227 in FIG. 3 correspond to like numbered elements 200-227 presented in FIG. 2, and both the description and the function of each element are correspondingly alike. Illumination converter system 300 includes illumination converter 200 having a spiral-wound portion 202 and a planar portion 204 that extends tangentially from the spiral-wound portion 202. Spiral-wound portion 202 has a central axis 250 and includes a light input surface 222, a light reflective edge 218, and a light output region 227 that separates spiral-wound portion 202 from planar portion 204. Light output region 227 is parallel to central axis 250.

Illumination converter system 300 further includes an LED 370 capable of injecting light into light input surface 222. Optional collimation optics 365 and an optional light integration cylinder 360, as known to one of skill in the art, can also be disposed between LED 370 and light input surface 222 to at least partially collimate and homogenize the light entering illumination converter 200.

In one particular embodiment, the spiral-wound portion 202 may be formed from a continuous film that forms both the spiral-wound portion 202 and the planar portion 204. In some cases, the planar portion 204 can be extended to form a display waveguide (a display backlight may be more generally referred to as a waveguide), as described elsewhere. In some cases, the planar portion 204 can be coupled to a separate backlight 380 (or waveguide) that may be fabricated from the same or different materials as the visible-light transparent film 210. Preferably, there is a gap 384 between the light output edge 216 of the illumination converter 200 and a backlight input edge 382 of the backlight 380, where the gap 384 is about one-half the thickness of the backlight 380, one fourth the thickness of the backlight 380, or even less, and may be filled with either air or a material having an index of refraction less than the index of refraction of the visible-light transparent film 210. The gap 384 can result in an improvement of the system efficiency and illumination uniformity. In one particular embodiment, optional light extraction features 388 can be included in backlight 380 to provide uniform light extraction across front surface 386, as known to one of skill in the art.

The waveguides may be tiled to illuminate a larger display. For example, the waveguides may be arranged in a 2×1, a 2×2, a 3×2 or larger array. A waveguide may also have an illumination converter on opposing edges, or several converters may be used on a common waveguide. The LEDs may also be placed underneath the display panel, where the thin waveguides may be tiled to form an array. This configuration may be particularly useful for displays using regional illumination for improved contrast and power efficiency.

The visible-light transparent film (110, 210) can be fabricated using a technique for producing waveguide sheets. This technique can be used for producing polymer film and thin sheet waveguides having one or more edges that are smooth and have a controlled angle or curvature or both. The technique is to stack two or more flexible films or sheets between two clamping plates, thereby creating an assembly of clamping plates and films or sheets. The assembly is then ground and polished on at least one edge. At least one of the ground or polished edges may be coated with materials such as metals, dielectrics, and microstructured materials.

Manufacturing thin film or sheet waveguides can be difficult, because the edges affect the overall performance of the system. In general, the edges serve one or more of 3 functions. First is to transmit light from a light source such as an LED, second is to reflect light along the waveguide by TIR, and third is to reflect light at near normal angles at the end of the backlight, increasing system efficiency and uniformity. In all 3 cases, it is important that the edges of the light guide not increase the etendue of the light through scattering and non-orthogonal surface reflection. The fabrication of optically smooth and orthogonal surfaces in a thin film or sheet is difficult using conventional processes.

In some cases, one or more of the edges are often coated with an optical material, such as a thin layer of silver or aluminum, or can have a microstructure applied to the edge, as described elsewhere. In such systems, it can be important that there be complete coating of the surfaces, but little extension of the coating beyond the edges. In some cases, for example, metal overspray onto the film or sheet planar surfaces can cause losses through scattering, absorption or both scattering and absorption, and result in a non-uniform backlight. In some cases, it may also be desired to dispose a controlled curve on one or more edges of the film. Applications that can benefit from a curved edge include, for example, efficient coupling of light from one waveguide to another.

A technique for producing thin and efficient waveguides is described, where the thin waveguide technique allows processes to be used that produce particularly transparent waveguides, in particular solvent and e-beam cured resins. The technique uses two clamping blocks that have sufficient thickness to be rigid, and are either made of erodible or non-erodible materials. If they are made of erodible materials, the dimensions of the block for the surfaces that will be ground and polished should be equal or greater than the final dimension desired in the completed product. If the clamping blocks are made of a hard non-erodible material, the dimensions should be equal or smaller than the final dimensions. The clamping blocks may be constructed from a combination of a hard material to provide rigidity, and a soft material that can be eroded without substantially wearing out the grinding and polishing media.

The film stack may be ground and polished with the edge thickness axis perpendicular to the film plane, or the stack may be ground such that the edge thickness axis is at an angle to the film plane. The angle may range from 0 degrees to 45 degrees or more. As used herein, the terms films or sheets are used interchangeably, and also include flat or tapered films or sheets. In general, the films are less than 10 mm thick, more preferably less than 1 mm thick, and most preferably less than about 200 microns thick.

It is also possible to grind and polish the stack such that it forms a simple or complex curve in one or more planes. A curve having surfaces approximately parallel to the normal axis of the film or sheet may be formed by grinding and polishing the edge into the desired shape. A curve with the curve surface parallel to the film plane may be made by interleaving the optical films with films that are more easily eroded than the optical film, to create a convex surface, or less rapidly eroded, to create a concave surface. Suitable highly erodible films include polyolefins, polymers with a glass transition less than 25 degrees C., porous polymers, and fluorocarbon film. The erodible material may also be a wax or friable coating on the film. Suitable films with low erosion rates include crystalline polymers such as polyesters, including polyethylene terephthalate, and amorphous polymers including polymethylmethacyrlate, epoxies, and polymers or coatings filled with hard particles including ceramics or metals.

A conformable polishing media can be used for creating a curved surface normal to the plane of the film. It may also be desirable to have the grinding media conformable as well, especially the pre-polishing grinding media. Suitable grinding and polishing media include felts, polymer films, and elastic media such as a rubber surface. Processing conditions can influence the degree of curvature, with higher pressure between the film surface and the media generally producing higher curvature.

Films or sheets may be cut larger than the final desired size, then assembled into a stack and pressed into an assembly with the clamping blocks and a means for applying suitable force to retain the integrity of the stack. One or more of the edges may then be ground and polished using conventional means, especially using lapping plates and polishing media. The stack edges may then be cleaned and coated with one or more of a hard coating, a metallic coating such as aluminum or silver, adhesion promoting layers to prime the surface for subsequent coatings, dielectric coatings, including antireflection, broad band, and spectrally or polarization selective coatings, and antistatic coatings.

In one particular embodiment, the edges may also be coated with a microstructured material. A suitable process for creating a microstructure at the edge of each film or sheet is to apply a combination of a curable resin and a microstructured tool to the ground and polished surface of the assembly. Preferably, the microstructure is designed to allow a relatively small fraction of the microstructure to be damaged when the film or sheet stack is separated. This may be accomplished through a combination of choice of resin properties, especially strength, hardness, toughness, and fracture mechanics, by choice of the microstructure, such as having natural fracture locations in the microstructure, and by the thickness of the microstructure and resin. As an example, a brightness enhancing film (BEF) structure can be added to the edge of the stack by taking a UV transparent tool such as a cast and cured BEF pattern on polyethylene terephthalate (PET) film, coating the structured side of the film with a UV curable resin, applying the coated tool to the polished assembly along one edge, UV curing the resin, removing the tool, and peeling apart the films.

In some cases, it may be desirable to prevent material such as resins and coatings from penetrating between the layers of films. Materials may be applied to the film before stacking or to the edge of the stack after polishing and cleaning. Suitable materials include wax, fluorocarbon fluids (such as Fluorinert™ fluids, available from 3M Company), oils, polymers, and other materials that either can be removed, or seal the edges but will remain part of the film layers.

EXAMPLE

Several 50 micron thick films made from N-BK7 glass are cut into 65×65 mm right triangles using a CO2 laser slitter. A stack of 50 of the triangles are compressed together using clamping faces to form an extended right triangle stack about 25 mm thick. The clamping faces are made of 6 mm thick polymethylmethacrylate (PMMA) plates that are 63×63 mm right triangles, and are centered on the exterior surfaces of the stacked triangular glass faces. The clamps provide sufficient force to hold the glass triangles in position during subsequent grinding and polishing operations, but not so much force that the glass surfaces are damaged. The clamp includes a bracket that can be moved such that the sides and hypotenuse of the triangles can be accessed by grinding and polishing media. The sides and hypotenuse of the stack of glass triangles are ground and polished with laps oriented such that the grinding and polishing forces are parallel to the edges of the glass triangles. The hypotenuse of the clamped glass triangles are then coated with about 100 nm of silver metal using physical vapor deposition, and the sides of the triangle are coated with an antireflective coating such as magnesium fluoride. The stack of glass triangles are then separated and cleaned, and each of the glass triangles can be formed into a glass spiral illumination converter.

One of the glass triangles is heated to a temperature between about 50 and 170 degrees C. above the glass transition temperature of 557 degrees C., and one of the acute vertexes of the triangle is lifted with a mandrel to form a cylinder with a 100 micron diameter. The mandrel continues to roll the cylinder to form a circular face made from a spiral of the edge of the triangle, in a manner similar to that shown in FIGS. 2A-2B. The glass and mandrel are then cooled to below the glass transition temperature, the mandrel is removed, and the glass spiral is annealed.

The performance of the annealed glass spiral was simulated using LightTools software (available from Synopsis Corp., Pasadena, Calif.). For the simulation, the glass spiral was wound with a 10 micron air space between the glass layers in the spiral, producing a spiral 63 mm long having a 2 mm diameter. An LED measuring 0.5×0.5 mm that was 0.3 mm thick was immersed in air and coupled to light collimation optics including a primary lens having a 1.54 mm diameter and a thickness of 1.04 mm. The first surface of the primary lens was planar and positioned 200 microns from the LED, and the second surface had a 1.0486 curvature. A second lens measuring 1.8 mm in diameter with a 1.1 mm thickness was positioned along the optical axis from the coupled primary lens. The second lens included a first surface having a 0.239 curvature positioned 100 microns from the second surface of the primary lens, and a second surface positioned 100 microns from the circular face of the spiral having: a polynomial asphere with a 0.795 curvature, a −0.894 conic constant, a fourth order aspheric of −0.0026229, and a sixth order aspheric of −0.034828. The spiral light guide efficiently converted the circular LED illumination area created by the lenses, to a line of light exiting the edge of the spiral.

Following are a list of embodiments of the present disclosure.

Item 1 is an illumination converter, comprising: a spiral-wound portion of a visible-light transparent film having: a central axis about which the visible-light transparent film is wound; a light input surface perpendicular to the central axis, the light input surface comprising a first edge of the visible-light transparent film; a reflective surface comprising a second edge of the visible-light transparent film disposed at a 45 degree angle to the first edge of the visible-light transparent film; a light output region parallel to the central axis; and a planar portion of the visible-light transparent film extending tangentially from the spiral-wound portion of the visible-light transparent film to a light output edge of the visible-light transparent film, wherein the visible-light transparent film is a glass film.

Item 2 is the illumination converter of item 1, wherein the light output edge of the visible-light transparent film is parallel to the central axis.

Item 3 is the illumination converter of item 1 or item 2, wherein the spiral-wound portion further comprises a gap between adjacent layers of the spiral-wound portion such that total internal reflection (TIR) can occur within the visible-light transparent film.

Item 4 is the illumination converter of item 1 to item 3, wherein the gap comprises air or a material having a lower index of refraction than the visible-light transparent film.

Item 5 is the illumination converter of item 1 to item 4, wherein the reflective surface comprises a polished surface capable of supporting TIR.

Item 6 is the illumination converter of item 1 to item 5, wherein the reflective surface comprises a metalized surface reflector, a dielectric multilayer reflector, or a combination thereof.

Item 7 is the illumination converter of item 1 to item 6, further comprising a light emitting diode (LED) disposed adjacent the light input surface and capable of injecting light into the light input surface.

Item 8 is the illumination converter of item 7, further comprising light collection optics disposed between the LED and the light input surface.

Item 9 is the illumination converter of item 7 to item 8, further comprising a light integration cylinder disposed between the LED and the light input surface.

Item 10 is the illumination converter of item 8, further comprising a light integration cylinder between the light collection optics and the light input surface.

Item 11 is the illumination converter of item 1 to item 10, further comprising a film waveguide disposed to receive light from the light output edge.

Item 12 is the illumination converter of item 11, further comprising a gap between the film waveguide and the light output edge.

Item 13 is the illumination converter of item 12, wherein the gap comprises air or a material having a lower index of refraction than the visible-light transparent film.

Item 14 is the illumination converter of item 1 to item 13, wherein the visible-light transparent film further comprises an exterior surface coating having an index of refraction lower than the visible-light transparent film.

Item 15 is a backlight, comprising: the illumination converter of item 1 to item 14; and a light emitting diode (LED) disposed adjacent the light input surface and capable of injecting light into the light input surface.

Item 16 is the backlight of item 15, wherein the planar region of the visible-light transparent film further comprises light extraction features.

Item 17 is the backlight of item 15 or item 16, further comprising a film waveguide disposed to receive injected light from the light output edge.

Item 18 is the backlight of item 17, wherein the film waveguide further comprises light extraction features.

Item 19 is the backlight of item 17 or item 18, further comprising a gap between the film waveguide and the light output edge.

Item 20 is the illumination converter of item 19, wherein the gap comprises air or a material having a lower index of refraction than the visible-light transparent film.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An illumination converter, comprising:
a spiral-wound portion of a visible-light transparent film having:
  a central axis about which the visible-light transparent film is wound;
  a light input surface perpendicular to the central axis, the light input surface comprising a first edge of the visible-light transparent film;
  a reflective surface comprising a second edge of the visible-light transparent film disposed at a 45 degree angle to the first edge of the visible-light transparent film;
  a light output region parallel to the central axis; and
a planar portion of the visible-light transparent film extending tangentially from the spiral-wound portion of the visible-light transparent film to a light output edge of the visible-light transparent film,
wherein the visible-light transparent film is a glass film.

2. The illumination converter of claim 1, wherein the light output edge of the visible-light transparent film is parallel to the central axis.

3. The illumination converter of claim 1, wherein the spiral-wound portion further comprises a gap between adjacent layers of the spiral-wound portion such that total internal reflection (TIR) can occur within the visible-light transparent film.

4. The illumination converter of claim 3, wherein the gap comprises air or a material having a lower index of refraction than the visible-light transparent film.

5. The illumination converter of claim 1, wherein the reflective surface comprises a polished surface capable of supporting TIR.

6. The illumination converter of claim 1, wherein the reflective surface comprises a metalized surface reflector, a dielectric multilayer reflector, or a combination thereof.

7. The illumination converter of claim 1, further comprising a light emitting diode (LED) disposed adjacent the light input surface and capable of injecting light into the light input surface.

8. The illumination converter of claim 7, further comprising light collection optics disposed between the LED and the light input surface.

9. The illumination converter of claim 7, further comprising a light integration cylinder disposed between the LED and the light input surface.

10. The illumination converter of claim 8, further comprising a light integration cylinder between the light collection optics and the light input surface.

11. The illumination converter of claim 1, further comprising a film waveguide disposed to receive light from the light output edge.

12. The illumination converter of claim 11, further comprising a gap between the film waveguide and the light output edge.

13. The illumination converter of claim 12, wherein the gap comprises air or a material having a lower index of refraction than the visible-light transparent film.

14. The illumination converter of claim 1, wherein the visible-light transparent film further comprises an exterior surface coating having an index of refraction lower than the visible-light transparent film.

15. A backlight, comprising:
the illumination converter of claim 1; and
a light emitting diode (LED) disposed adjacent the light input surface and capable of injecting light into the light input surface.

16. The backlight of claim 15, wherein the planar region of the visible-light transparent film further comprises light extraction features.

17. The backlight of claim 15, further comprising a film waveguide disposed to receive injected light from the light output edge.

18. The backlight of claim 17, wherein the film waveguide further comprises light extraction features.

19. The backlight of claim 17, further comprising a gap between the film waveguide and the light output edge.

20. The backlight of claim 19, wherein the gap comprises air or a material having a lower index of refraction than the visible-light transparent film.

* * * * *